Nov. 25, 1958  G. L. HELLER ET AL  2,861,872
METHOD FOR GENERATING SILICON TETRAFLUORIDE
Filed March 30, 1955
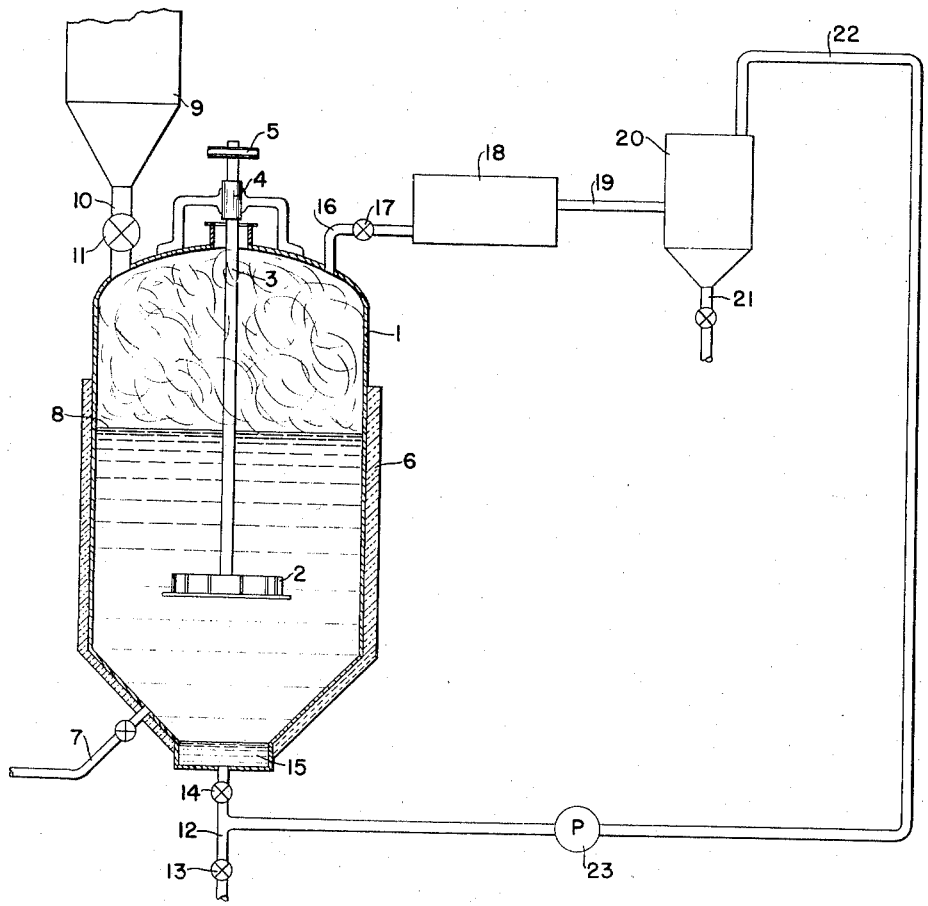
INVENTOR
GEORGE L. HELLER
JAMES A. WATSON JR.
BY CARROLL D. WALLACE JR.
Pennie, Edmonds, Morton, Barrows & Taylor.
ATTORNEYS ced Nov. 25, 1958

2,861,872

METHOD FOR GENERATING SILICON TETRAFLUORIDE

George L. Heller, Monroe, James A. Watson, Jr., Swartz, and Carroll D. Wallace, Jr., Monroe, La., assignors to Columbian Carbon Company, New York, N. Y., a corporation of Delaware Application March 30, 1955, Serial No. 497,982

5 Claims. (Cl. 23—205)

This invention relates to the generation of silicon tetrafluoride and provides an improved process whereby silicon tetrafluoride may be continuously produced, economically and in a state of high purity, excepting the presence of water vapor, by reacting hydrogen fluoride with silicon dioxide, sand, for instance.

The invention is of utility wherever the economic generation of silicon tetrafluoride is desired. However, it is especially useful in operations where the silicon tetrafluoride, so produced, is oxidized in a vapor state to form silica of extremely fine particle size.

There is a large and growing demand for extremely finely divided, light-colored pigments. Finely divided silica has many of the characteristics required to meet that demand. However, the cost of producing silica of the desired fineness has heretofore been so high as to prevent its use from being economically feasible for many purposes. A large part of this cost has been the expense of producing silicon tetrafluoride, or other silicon compounds which may be readily converted to finely divided silica. The present invention provides a method whereby silicon tetrafluoride can be produced continuously and at a cost sufficiently low to meet that need.

The reaction of hydrofluoric acid with siliceous materials, with the generation of silicon tetrafluoride, has heretofore been known. However, serious difficulties have been encountered in attempts to carry out the reaction on a commercial scale, due to the presence of objectionable impurities in the evolved silicon tetrafluoride, the tendency toward a reverse reaction and excessive costs.

It has been proposed, for instance, to react hydrogen fluoride in aqueous solution with siliceous fluorspar according to the reaction (1)     $CaF_2SiO_2 + 6HF \rightarrow CaF_2 + H_2SiF_6 + 2H_2O$ and thereafter treat the hydrofluosilicic acid with sulfuric acid to decompose the former acid to form silicon tetrafluoride and hydrogen fluoride according to the reaction (2)     $H_2SiF_6 \rightarrow SiF_4 + 2HF$ It has also been proposed to react hydrogen fluoride with sand. Where this reaction is carried out in the presence of water, hydrofluosilicic acid results. Theoretically, where the water is omitted, silicon tetrafluoride is formed directly by the reaction. However, we have found that, when hydrogen fluoride is passed in contact with dry sand, the reaction between the silica and the hydrogen fluoride proceeds so slowly that much of the hydrogen fluoride passes through the sand unreacted, thus polluting any $SiF_4$ which may be formed.

We have discovered, quite surprisingly, that by suspending sand in glycerine, as by agitation, and passing hydrogen fluoride in gaseous form through the suspension, the hydrogen fluoride can be caused to react rapidly and substantially completely with the $SiO_2$ of the sand to form substantially pure $SiF_4$ and water vapor according to the reaction (3)     $SiO_2 + 4HF \rightarrow SiF_4 + 2H_2O$ and that, by carrying out this reaction at a temperature hereinafter described, once equilibrium has been established, the silicon tetrafluoride and water vapor are expelled from the suspension substantially as rapidly as formed, thus avoiding any detrimental accumulation of water in the reaction mixture which might result in the formation of hydrofluosilicic acid.

The reaction temperature is subject to considerable variation. However, it should be sufficiently high to insure the rapid expulsion of the silicon tetrafluoride and water vapor from the suspension. On the other hand, it should not be so high as to cause substantial vaporization of the glycerine, which boils at 290° C. (554° F.). Particularly advantageous results have been obtained where the reaction temperature has been maintained within the range of 250° to 350° F., and especially at about 280° F. At these temperatures, the $SiF_4$ and water vapor are rapidly evolved, after equilibrium has been established, and where a white glass-grade of sand is used, the glycerine remains clear and the process may be carried on continuously by continuously passing hydrogen fluoride through the suspension and adding sand thereto, continuously, or periodically as required, to replace that consumed by the reaction.

The reaction may be carried on at atmospheric pressure, or at higher or lower pressures, where desired. We have successfully used pressures of 2 inches of Hg below atmospheric. But pressures slightly above atmospheric, say about 4 inches of water, have been found particularly advantageous, in some instances, in order to eliminate the need of pumps to force the effluent gases from the reaction vessel to or through subsequent apparatus.

We have found the effluent vapor mixture of silicon tetrafluoride and water vapor to be relatively stable, there being no apparent reversal reaction at temperatures within the range of 212° to 600° F. We have even heated the effluent vapor mixture to temperatures as high as 800° F. without appreciable reversal of the reaction by which they were produced.

Also within the temperature range defined above, the glycerine appears to be substantially inert with respect to the hydrogen fluoride and sand and to the silicon tetrafluoride and water vapor resulting from the reaction.

We cannot explain with certainty the function of the glycerine other than that of a suspension medium. However, the glycerine appears in some manner to expedite the reaction and prevent objectionable side, or reverse, reactions. Being a solvent for the hydrogen fluoride, its function may be that of holding the hydrogen fluoride in sustained and intimate contact with the sand. Also, being highly compatible with the water formed by the reaction and having a strong affinity for water, the glycerine may aid in dispersing or removing water from the reaction, as formed, or in some way reducing its mass action effect at the point of formation, thus promoting the desired reaction.

In an effort better to account for these surprising results, we have examined the glycerine remaining in the reaction vessel after several runs and have observed that the original volume of glycerine has been increased by about 10% and that an increase in specific gravity from 1.26 to 1.31 has occurred. The liquid remains clear but assumes a somewhat greenish fluorescence.

On further analysis of the glycerine reaction medium, no appreciable amount of unreacted hydrogen fluoride was found. However, the glycerine appeared to contain considerable proportions of water and of silicon tetrafluoride, either dissolved therein or in some manner held therein even under operating temperatures of over 250°

F. Most of the glycerine was recovered by fractional distillation.

In spite of this presence of water and silicon tetrafluoride, the glycerine reaction medium has been found to be stable, even on prolonged standing either at operating temperatures or normal temperatures.

We have further observed that in starting the process using fresh glycerine and sand, there is a considerable time lag following the injection of the hydrogen fluoride, sometimes as much as 30 minutes, before evolution of silicon tetrafluoride begins. However, where we have used glycerine from a previous operation, the silicon tetrafluoride is almost immediately evolved following injection of the hydrogen fluoride. It appears, therefore, that some condition of saturation or equilibrium must be attained before the operation proceeds normally.

Though we have used glycerine for the reaction medium with outstanding advantages, other polyhydric alcohols, or, in fact, other non-aqueous organic compounds, which are solvents for the hydrogen fluoride and which are chemically inert with respect to hydrogen fluoride, sand, silicon tetrafluoride and water under reaction conditions, and which have boiling points sufficiently high to avoid substantial vaporization thereof at the reaction temperature, say not less than 350° F. and which are highly compatible with, and have a marked affinity for, water, i. e. hygroscopic, may be used without departing from the scope of the invention.

In our experimental work, we have used glycerine of USP grade. However, ordinary commercial grades of glycerine may be used with advantage. Because of its relatively high density, the glycerine facilitates the holding of the sand in suspension.

It will be understood that, in place of sand, other high grade forms of silicon dioxide may be used. But sand, or other granular forms of siliceous material, is preferred.

Once equilibrium has been established the reaction proceeds according to the previously noted reaction 3, in substantially stoichiometric proportions. This reaction is exothermic and once the desired reaction temperature has been obtained, very little externally applied heat is required to maintain the reaction temperature, depending, of course, upon heat losses from the system through radiation and convection. Thus low heating cost adds to the economy of the operation.

It has previously been proposed to oxidize silicon tetrafluoride by heating it to an elevated temperature in the presence of water vapor, the reaction resulting in the formation of silicon dioxide and hydrogen fluoride. Where our present process for generating silicon tetrafluoride is used in conjunction with such operation, the hydrogen fluoride liberated by the oxidation reaction may be separated from the other products of the oxidation and continuously recycled to the generating operation of our present invention, thus effecting further economy in the system.

Our invention will be further described and illustrated with reference to the accompanying drawing which represents, conventionally and somewhat diagrammatically, apparatus especially adapted to carry out the process and, more particularly, an operation in which the silicon tetrafluoride, so generated, is subsequently oxidized and the resultant hydrogen fluoride recycled to the generator.

In the drawing, the silicon tetrafluoride generating vessel is indicated at 1 and is provided with an agitator 2 secured to agitator shaft 3 rotatably mounted in bearing 4 and adapted to be rotated by any suitable source of power through pulley 5.

The vessel 1 is jacketed over its lower portion by heating means represented at 6 which may be in the form of a steam jacket, or an electrical heater adapted to maintain the contents of the vessel at the predetermined temperatures.

Glycerine, or an equivalent thereof as previously described, is charged into the vessel through valved connection 7 to a height indicated at 8. With the agitator in motion, the glycerine is then brought to the desired operating temperature and sand from the bin indicated at 9 is run into the vessel through conduit 10 provided with valve 11 of any suitable type, for instance, a star valve. A suspension of the sand in the glycerine is thus obtained.

After the suspension has been uniformly heated, hydrogen fluoride is charged to the vessel through connection 12, provided with valves 13 and 14, and is passed upwardly through the suspension of glycerine and sand. Advantageously, the hydrogen fluoride inlet is provided with means for dispersing the stream of gas as it enters the vessel so as to promote uniform contact between the hydrogen fluoride and the sand in suspension. It is desirable to provide a pool of mercury 15, in the lower part of the vessel through which the hydrogen fluoride initially passes.

The gases evolved from the suspension, consisting substantially entirely of silicon tetrafluoride and water vapor, are withdrawn from the vessel through outlet conduit 16 provided with valve 17 by which the pressure maintained in the vessel may be controlled.

Where the silicon tetrafluoride is to be oxidized to silicon dioxide, the vapors from the vessel 1 may be passed directly through conduit 16 to the oxidizing chamber 18 and the effluent therefrom passed through conduit 19 to separating apparatus indicated at 20. The solid silicon dioxide separated from the effluent gases is precipitated in apparatus 20, is withdrawn therefrom through valved connection 21, and the hydrogen fluoride formed by the oxidation reaction is withdrawn from the separator through conduit 22 and passed by means of pump 23 through inlet conduit 12 to the reaction vessel 1.

In starting the operation, the hydrogen fluoride may be supplied from an available external source but, as the operation proceeds, the regenerated hydrogen fluoride may be recycled to the generator and thus little or no extraneous hydrogen fluoride may be required, depending upon the efficiency of the oxidation and separation steps.

As previously noted, sand is charged to the system, either continuously or periodically, as required. It is usually desirable to maintain a substantial excess of sand in the suspension. However, as long as adequate sand is present to react with the hydrogen fluoride as the latter passes through the suspension, the rate and manner of supplying the sand to the suspension is not critical. The agitation should be sufficient to maintain the sand in suspension in the glycerine, or other equivalent liquid, and the heat supplied during the operation may be just sufficient to maintain the suspension at the predetermined reaction temperature.

The proportions of glycerine and sand used do not appear to be critical. Sufficient glycerine should be used to hold the sand or other siliceous material in suspension, and as previously noted, sufficient sand should always be present to react with all of the hydrogen fluoride.

For instance, in operating at temperatures of about 280° F., and at a pressure of about 2 inches of Hg below atmospheric pressure, we have obtained eminently satisfactory results by continuously charging sand to a reaction vessel containing 200 parts of glycerine, at a rate of 100 parts per hour, and hydrogen fluoride at a rate of 133 parts per hour, each by weight. After the equilibrium condition, discussed above, had been established, which required about 30 minutes, the silicon tetrafluoride was evolved at the rate of 173 parts per hour in admixture with 60 parts per hour of water vapor.

Results approximating those noted above have also been obtained where ethylene glycol has been substituted for the glycerine. However, in using ethylene glycol, at the prescribed reaction temperatures, there appeared to be some volatilization of the glycol. Also, the solubility of the F-Si complex (probably silicon tetrafluoride) in the glycol appeared to be somewhat higher than in glycerine.

The reaction similarly proceeded where propylene glycol (1,2-propanediol) was substituted for the glycerine. However, the particular propylene glycol used was found to be much less satisfactory than either glycerine or ethylene glycol. It was not entirely stable with respect to the hydrogen fluoride at the elevated temperatures. It was observed that water-insoluble, non-volatile reaction products were formed, including a black oily material soluble in acetone. Also, an appreciable loss of this reaction medium was observed.

Because of the corrosive nature of the fluorine compounds, the generating vessel and auxiliary equipment with which these compounds come in contact should be constructed of materials resistant to corrosion thereby. Advantageously, the reaction vessel and agitator may be constructed of Monel metal, or its equivalent. Stellite may also be used. The tube 16 and valve 17 may, with advantage, be constructed of Monel, for instance.

We claim:

1. Process for generating a mixture of silicon tetrafluoride and water vapor which comprises reacting hydrogen fluoride with silicon dioxide while the latter is suspended in a hygroscopic polyhydric alcohol which is a solvent for hydrogen fluoride and boils at a temperature not less than 350° F., and while maintaining the suspension at a temperature in excess of the boiling point of water but not exceeding the boiling point of the alcohol, and withdrawing from the zone of reaction silicon tetrafluoride and water vapor evolved from the liquid suspension.

2. Process for generating a mixture of silicon tetrafluoride and water vapor which comprises reacting hydrogen fluoride with silicon dioxide while the latter is suspended in glycerine, the temperature of the suspension being maintained in excess of the boiling point of water but not exceeding the boiling point of the glycerine, and withdrawing from the zone of reaction silicon tetrafluoride and water vapor evolved from the liquid suspension.

3. Process for generating a mixture of silicon tetrafluoride and water vapor which comprises reacting hydrogen fluoride with silicon dioxide while the latter is suspended in ethylene glycol, temperature of the suspension being maintained in excess of the boiling point of water but not exceeding the boiling point of the glycol, and withdrawing from the zone of reaction silicon tetrafluoride and water vapor evolved from the liquid suspension.

4. Process for generating silicon tetrafluoride vapors which comprises reacting hydrogen fluoride with silicon dioxide while the latter is suspended in glycerine, the temperature of the suspension being maintained within the range 250° to 350° F., and withdrawing from the zone of reaction silicon tetrafluoride and water vapor evolved from the liquid suspension.

5. The process of claim 4 in which the suspension is maintained at about 280° F.

References Cited in the file of this patent

UNITED STATES PATENTS 1,959,748    Svendsen _____ May 22, 1934
2,535,036    Broughton _____ Dec. 26, 1950

OTHER REFERENCES

Mellor: "Treatise on Inorganic and Theoretical Chemistry" (1925), vol. 6, page 935.